March 8, 1932.   W. S. TOWNSEND ET AL   1,848,146
STEP-BY-STEP REMOTE CONTROL LIQUID DISPENSING APPARATUS
Filed July 13, 1927   3 Sheets-Sheet 1

Inventors:
William S. Townsend,
Leo Deutsch,
By Wilkinson, Huxley, Byron & Knight
Attys.

Witness:
P. Burkhardt.

March 8, 1932. W. S. TOWNSEND ET AL 1,848,146
STEP-BY-STEP REMOTE CONTROL LIQUID DISPENSING APPARATUS
Filed July 13, 1927 3 Sheets-Sheet 2

Witness:
R. Burkhardt

Inventors:
William S. Townsend,
Leo Deutsch,
By Wilkinson, Huxley, Byron & Knight
attys

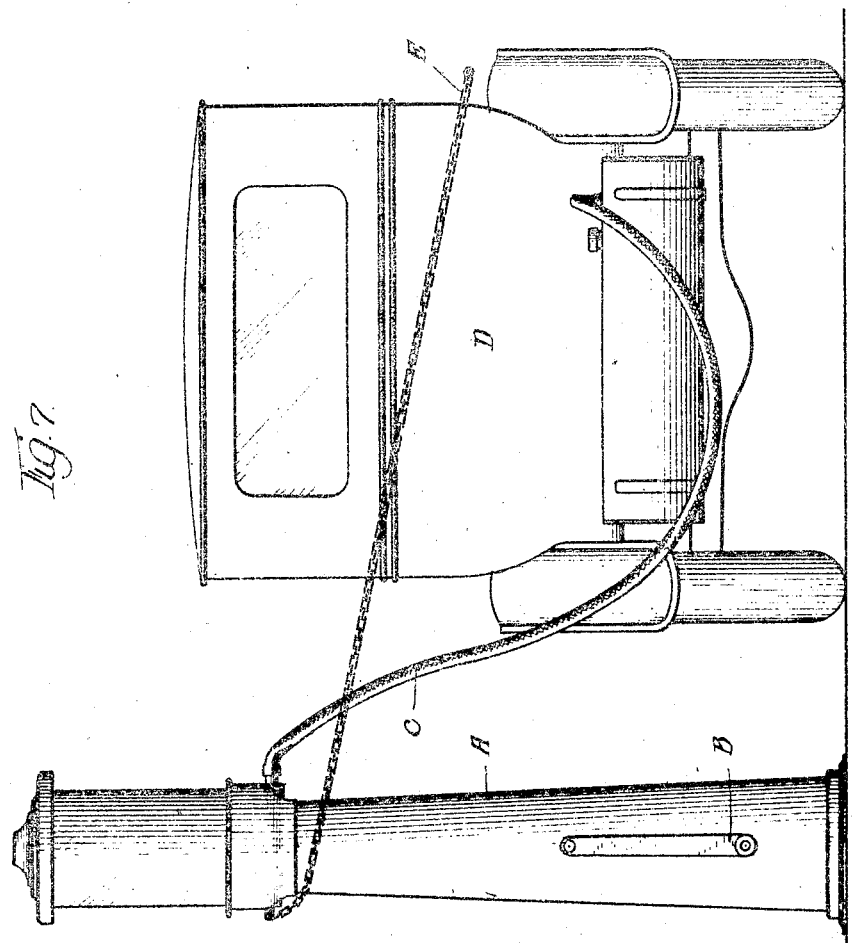
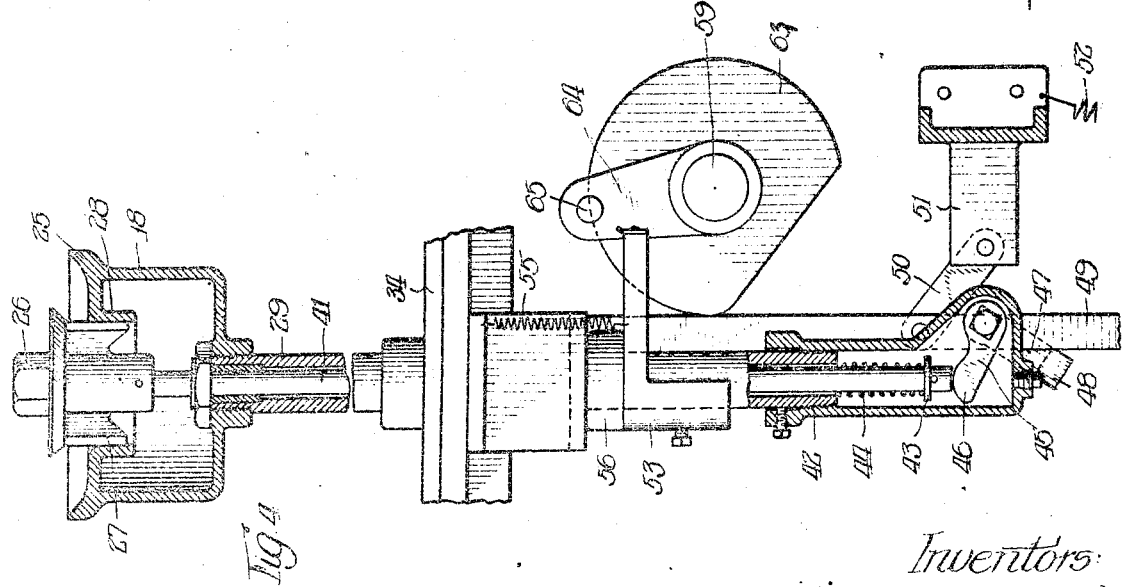

Patented Mar. 8, 1932

1,848,146

UNITED STATES PATENT OFFICE

WILLIAM S. TOWNSEND, OF ROCHESTER, AND LEO DEUTSCH, OF BEAVER, PENNSYLVANIA, ASSIGNORS, BY MESNE ASSIGNMENTS, TO THE WAYNE PUMP COMPANY, OF BALTIMORE, MARYLAND, A CORPORATION OF MARYLAND

STEP-BY-STEP REMOTE CONTROL LIQUID DISPENSING APPARATUS

Application filed July 13, 1927. Serial No. 205,323.

The invention pertains to a visible pump, and more particularly to a fluid dispensing pump so constructed that it may be controlled at a remote point from the pump, for instance, at the point of delivery, and may deliver additional amounts of fluid by mere operation of the pump from said remote point without the necessity of allowing a time interval to elapse while waiting for the measuring chamber to be filled for said additional amount.

In pumps now in use, it is not unusual to provide a visible measuring chamber in which there is disposed a movable measuring and delivering pipe which is adapted to have either motions of rotation or translation, or a combination of the two, for setting the pipe for a delivery of only a predetermined amount of fluid, the fluid being delivered to a delivery hose through a valve provided on the outside of the pump and operated at said valve. It is possible to deliver at one setting only the amount of fluid at which the measuring pipe is set, and in order to deliver more fluid, it is necessary to reset the pipe and pump the fluid into the measuring chamber, properly leveling it and then discharging it by means of actuation of the discharge valve. It will be seen then that it is first necessary for the attendant to pump the fluid into the measuring chamber, position the delivery hose at the point of delivery, in a particular instance the gas tank of an automobile, properly level the fluid at a predetermined amount and then operate the discharge valve, the operation of the valve being controlled at the pump and at a remote point from the point of delivery. So it will be readily understood that in order to deliver more fluid, a time interval must elapse while the additional fluid is being properly measured, which is objectionable from the point of view of waste of time and the possible repeated trips from the measuring gauge of a gas tank to the discharge valve of the pump.

It is therefore an object of this invention to provide a device for accurately measuring and delivering fluid, which device may be readily and positively controlled at a distance remote from the device, such as at the point of discharge.

A further object is to provide a device which is adapted to measure and deliver fluid from a reservoir, such as a measuring chamber of a visible pump, such measure of the fluid being in a direction from the top of said chamber toward the bottom thereof.

A still further object is to provide a novel measuring cap for accurately measuring fluid in a reservoir, said cap being provided with a valve for supplying the fluid to a discharge hose through a flexible or collapsible tube associated with said cap and discharge hose.

Another object is to provide a valve so disposed that it is in view at all times and is operable from a point remote from the apparatus, yet is within the measuring chamber thus eliminating the usual external discharge valve.

Still another object is to provide operating means for delivering fluid at a point remote from an apparatus, said means being operable at the same or another remote point, and said means being of such character as will discharge additional predetermined amounts of fluid by the simple operation of said operating means at the point of initial operation or some other point without the necessity of allowing the elapse of a time interval for the setting for and pumping of the additional amounts of fluid.

Another object is to provide a novel setting device for determining an amount of fluid to be discharged, which device cannot be accidentally or unauthorizedly reset.

An additional object is to provide delivery control mechanism particularly for the discharge of fluid from a dispensing device, so arranged and disposed that operation of the mechanism places the mechanism in delivery position, a further and continued operation moving the mechanism for delivery of an additional amount, further additional amounts being delivered by a simple repetition of the operation.

A further object is to provide an inexpensive and positive visible dispensing apparatus which is not complicated, can be operated at a remote distance from the apparatus and may be operated to deliver selected additional amounts of fluid continuously.

Other specific objects will readily appear from the detailed specification, drawings and claims appended hereto.

In the drawings, wherein like reference characters are used to designate like parts—

Figure 4 is a fragmentary enlarged detailed sectional elevation of the discharge valve and certain operating parts therefor, showing the valve in open position;

Figure 7 is a diagrammatic elevation, showing the relation of the parts of the apparatus for the delivery of fluid to the tank of an automobile, there being also indicated the remote position from the apparatus at which actuation may take place.

Figure 1:
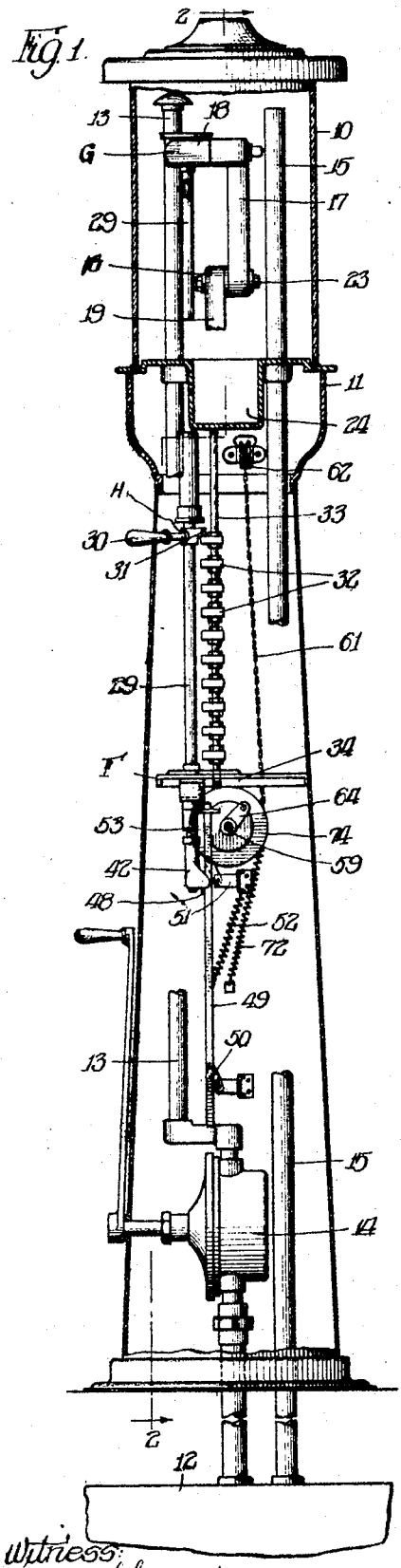
Figure 1 is a partial sectional elevation through the apparatus, showing the relation of the parts when the discharge valve is at its maximum setting.

In general, the visible dispensing apparatus A will be provided with the usual pump actuating means B for pumping the liquid into the measuring chamber and the usual hose connection C operatively connected to the measuring chamber in such a way that the fluid may be delivered from said chamber to the proper place, such as the gas tank of an automobile D, it being possible to control at a remote point therefrom by any means such as the flexible chain E. This chain operates suitable mechanism F provided for the apparatus so that a predetermined amount of fluid may be discharged from the measuring chamber, through the valve G set by the mechanism H and through the hose C, a continued operation of the chain serving to so actuate the valve G that additional amounts of fluid may be discharged to the vehicle without the necessity for the elapse of a time interval to allow for the replenishing of the measuring chamber.

More specifically, in this novel apparatus a properly graduated measuring chamber 10 is shown mounted upon a supporting casing or standard 11 and is adapted to receive fluid from the proper reservoir or tank 12, the fluid being delivered through preferably a capped delivery pipe 13 connected to the tank 12 through any suitable pump 14, which of course may be either of the hand or motor type. A suitable valve or overflow pipe 15 connected to the tank 12 determines the proper level of the fluid in the measuring chamber and may be provided with a suitable cap, such as illustrated in the co-pending applicaton, Serial No. 115,727, MacMillen, filed June 14, 1926, for preventing the loss of fluid due to capillary attraction causing an inaccuracy in the amount leveled.

Adjustably mounted in the measuring chamber is a collapsible or jointed discharge pipe 16 including an upper section 17 communicating with the valve cup 18 and a lower section 19 communicating with the discharge hose 20. It will be seen that the upper arm 17 is pivoted to the valve cup 18 by a suitable pivot 21, allowing communication between the cup and the arm, the lower arm 19 is suitably pivoted at 22 to a connection allowing communication between the lower arm 19 and the hose 20, and there is also a suitable communicating pivot 23 provided between and permitting communication between the upper and lower arms 17 and 19 respectively. The measuring chamber is provided with a recess 24 for the reception of the collapsible pipe 16 and this recess may be suitably connected through a conduit and valve (not shown) to the overflow pipe so that the measuring chamber may be completely emptied of the fluid.

Figure 6:
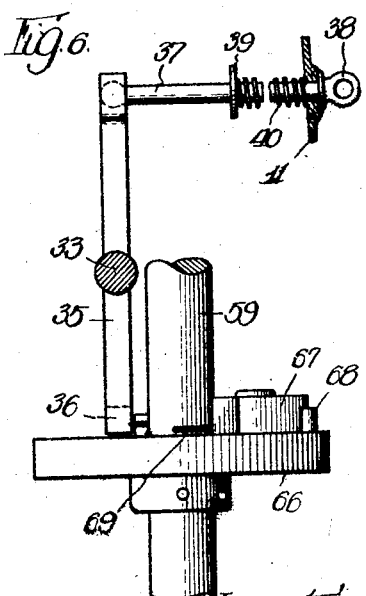
Figure 6 is a fragmentary sectional plan taken substantially on the plane as indicated by line 6—6 of Figure 5.

The discharge cup 18, it will be noticed, is provided with a suitable annular flange or lip 25 for determining the exact liquid level, the cup being also provided with a movable valve 26 adapted to be opened or closed for delivery of the fluid through the collapsible pipe. This valve may be conveniently provided with a depending skirt 27 having suitable ports or apertures therein, which skirt cooperates with a depending guide 28 provided on the cup for properly guiding the valve to a tight seat. The cup is threaded or otherwise secured to a suitable hollow tube 29, passing through a suitable stuffing box provided in the bottom of the measuring chamber to prevent leakage, and has fastened thereto a setting handle 30 provided with a lug, stop or projection 31 for cooperating with other lugs, stops or projections 32 keyed or otherwise fastened at suitable intervals to a rotatable shaft 33 to thereby determine a selected amount of fluid to be delivered. The member 33 may be suitably pivoted to a supporting member 34 conveniently placed and connected to the casing 11. Stop rod 33 has fastened thereto a bar 35 provided with a depending projection 36 and provided with a link 37 extending from another portion of said bar 35 through the casing 11 and provided with a suitable operating means 38 for moving the rod 33. This link 37 may conveniently be pivoted to the bar 35 by means of a ball and socket joint. The link is also provided with a fixed collar 39, between which and the casing a spring 40 may be disposed surrounding the link 37 for the purpose of returning the stop bar to the position shown in Figure 6 where the stops 31 and 32 may register. The valve 26 is connected to a rod 41 running through a suitable stuffing box in the cup, through the tube 29, into a member 42 threaded or otherwise secured to the tube and containing operating means for the valve.

Figure 3:
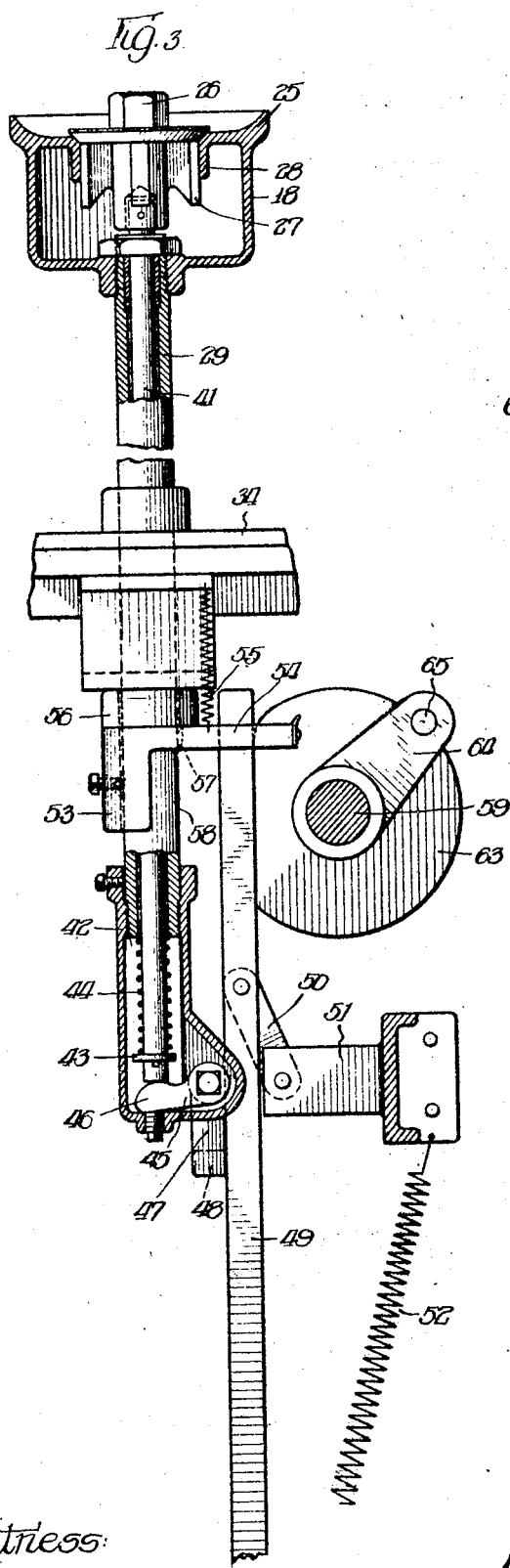
Figure 3 is a fragmentary enlarged detailed sectional elevation of the discharge valve and certain operating parts therefor, showing the valve in closed position.
Figure 5:
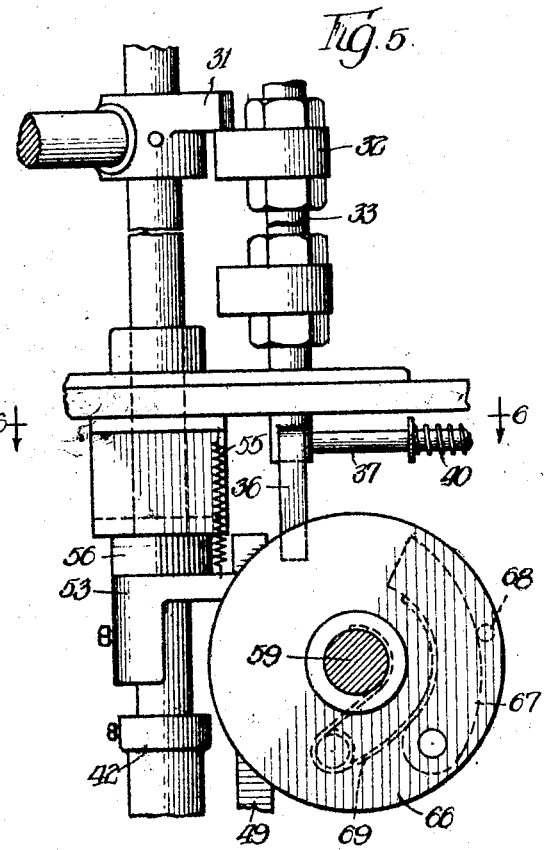
Figure 5 is a fragmentary detailed elevation on an enlarged scale, showing the cooperation between the measuring rod and stop rod and the actuating means for the latter.

At or near the lower end of the rod 41, there is provided a fixed collar 43, between which and a shoulder forming portion of the tube there is a spring 44 disposed around the rod 41 tending to move the valve downward to a closed position in the cup. A member or sleeve 42 is fastened to the lower portion of the tube 29 and surrounds the lower end of the rod 41 for the purpose of providing a support for valve operating means and a lubricating container for the moving parts contained therein. Pivoted to the member 42, there is an operating means 45 in the form of a bellcrank lever, having one arm 46 contacting with the lower end of the rod 41 and another arm 47 disposed at an angle to said arm 46 and being provided with a lug 48 disposed in way of the operating rod 49. This rod is pivoted by means of suitable links 50 to brackets 51 disposed in convenient places along said rod and attached to the casing 11. A spring 52 is disposed between any number of said brackets and said operating bar 49 for the purpose of returning the bar to the position illustrated in Figure 3; that is, where the valve 26 is in closed position.

A clutch member 53 is shown provided on the tube 29 in non-rotatable relation thereto, said clutch member having an arm 54 extending in one direction for cooperation with an actuating means. This clutch member is provided with a spring 55 disposed between a portion of the support 34 and said clutch member for the purpose of returning said clutch member to a position where it will be suitably spaced from the member 34 by a collar 36 and in a position to be operated to properly move the tube 29. This clutch member may take any convenient form, such as having a suitable tooth 57 adapted to engage corresponding teeth or apertures 58 provided on the tube 29. A shaft 59 is suitably pivoted to the casing in proper bearings and is provided with suitable sheaves 60, one of which 74 has fastened thereto the operating chain 61 which runs upwardly over other guiding sheaves 62 and is of such length as may be operated at a remote point from the pump. The other sheave 71 has fastened thereto one end of a tension spring 72, the other end of which is fastened to a suitable bracket 73, which spring tends to return the shaft 59 to a position wherein the valve 26 is closed. The shaft 59 is also provided with a suitable cam 63 cooperating with the actuating bar 49 for moving said bar to a predetermined position. This shaft also carries a crank 64 having an actuating pin 65 thereon adapted to cooperate with the arm 54 of the clutch 53 for the purpose of moving said clutch member to a predetermined position. The shaft 59 also carries a suitable disc 66 having a spring pressed pawl 67 pivoted thereon, said pawl being urged toward an outward position limited by a pin 68, by the spring 69 disposed between the pawl and the shaft.

Figure 2:
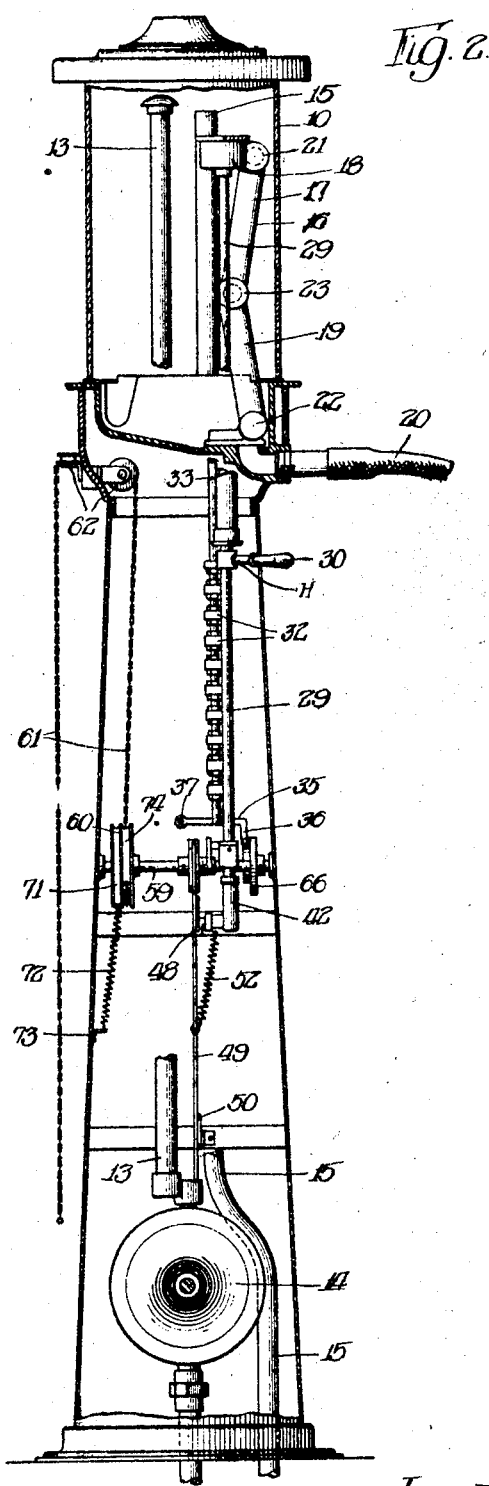
Figure 2 is a partial sectional elevation of the apparatus shown in Figure 1, taken substantially on the plane as indicated by the lines 2—2 of Figure 1.

As shown in Figures 1 and 2, the parts are in maximum raised position, said parts being releasably locked in their uppermost position by means of the engagement of the stops 31 and 32, it being understood that the valve 26 is in closed position. If then five gallons is to be delivered, it being assumed the measuring chamber 10 is filled, it is only necessary to operate the member 38, pulling it outwardly, compressing the spring 40, causing the rod 33 to revolve, moving the stop 32 out of contact with the stop 31. The handle then may be used to move the cup into proper position to deliver five gallons, it being seen that the measuring is accomplished in a direction from the top down of the measuring chamber, after which operation the member 38 is released, the spring returning to a position where the proper stop 32 is in way of the stop 31. It is only necessary then to deliver the five gallons of fluid for an operator at a remote point to pull on the chain 61. The pulling action on the chain will cause the shaft 59 to revolve, moving the sheave 71, elongating the spring 72 disposed between said sheave and the bracket 73 fastened to the casing 11, this spring 72 as already described being for the purpose of returning the shaft 59 to its inoperative position when the chain is released. The motion of the shaft 59 will rotate the cam 63 which due to its engagement with the bar 49 will move said bar toward the left, from the position shown in Figure 3 to that shown in Figure 4. As this bar moves, it moves the arm 46 of the bellcrank upwardly due to engagement between the bar 49 and the projection 48 on the arm 47 of the bellcrank. The upward movement of the arm 46 compresses the spring 44, moving the rod 41 upwardly, opening the valve 26, allowing the fluid to flow past the valve 26 through the apertured skirt 27, into the cup 18, into the upper arm 17, through the joint 21, through the joint 23 into the lower arm 19, through the joint 22 into the hose 20, from thence being delivered to the proper source such as the tank of the automobile shown in Figure 7.

If then an additional amount of fluid is desired, it is only necessary for the operator to continue his pull on the chain to rotate the shaft an additional amount. This pull will cause a continued rotation of the shaft 59, causing the pin 65 to engage the arm 54 of the clutch 53. A continued engagement and pressure will then cause the clutch member to move the tube 29 downwardly due to engagement of the teeth 57 with the teeth 58. At the same time that this operation is taking place, the shaft 59 moves the disc 66 to cause engagement of the spring pressed pawl 67 with the projection 36 of the member 35. A continued movement of the disc will cause the shaft 33 to rotate, moving the stop 32 out of the path of the stop 31 so that the clutch member may operate to move the tube to a downward position, it being understood that while this operation is taking place, the valve 26 is in open position. After the pawl has passed the projection 36, the spring 40 will return the rod to such a position where the next lower stop 32 will be in the path of movement of the stop 31 so that the clutch can only move the stop 31 with reference to stop 32 one stop at a time, corresponding to a predetermined amount, as one gallon. If another gallon is desired, the operator must release his pull on the chain. The spring 72 then will return the shaft 59 to its inoperative position. The pawl 67 will pass the projection 36, it being moved toward the shaft 59 and returned to its outward position by the spring 69 after it has passed the projection 36. A release of the pin 65 from the operating arm 54 of the clutch will allow the spring 55 to return the clutch over teeth 58 to a position where it may again be operated, and the spring 44 will return the valve 26 to closed position as the cam 63 will rotate to allow the rod 49 to return to the position shown in Figure 3. It is then not necessary to reset the device by means of moving the handle 30, nor is it necessary to replenish the measuring chamber 10; it is only necessary to pull on the chain, which pull will cause an operation of the cam 63, rod 49 and bell-crank 45, and clutch 53 to move the valve to open and delivery position, as described above, a continued pull on the chain serving to move the valve to a position to deliver another predetermined amount.

From the above description it will be seen that applicants have provided a positive device for effectively delivering an amount of fluid without delay, said device being operable from a distant point to both deliver a predetermined amount and any additional amounts of fluid. It is to be understood that the embodiment of the device shown is merely by way of illustration and not by way of limitation as other and various forms of parts of the device will readily occur to those skilled in the art.

We claim:

1. In a device of the character described, the combination of a measuring chamber, means for supplying fluid thereto, means for conducting and discharging fluid therefrom, including a hose and mechanically operated means disassociated and remote from said hose for controlling step by step from a position remote from the device the discharge of fluid therefrom.

2. In a device of the character described, the combination of a measuring chamber, means for supplying fluid thereto, valved means for controlling the discharge of fluid therefrom, said valved means being adapted to be set for selective predetermined amounts of fluid to be discharged, means operable from a distance remote from the device for operating said valved means, and means operable from the same remote distance for operating said valved means to deliver additional amounts of fluid.

3. In a device of the character described, the combination of a measuring chamber, discharge means therein including a valve cup, a valve therein, and means operable from a remote point from said device for permitting discharging a predetermined amount of fluid from said chamber, said means being operable to control said valve and said means being operable to move said cup to a position to discharge an additional predetermined amount of fluid.

4. In a device of the character described, the combination of a measuring chamber, discharge means therein including a jointed pipe whose members are movable in relation to each other adapted to be set to discharge a certain amount of fluid, a device for operating said discharge means, and means for operating said last named device and discharge means to successively increase the amount of discharge of the fluid by predetermined amounts.

5. In a device of the character described, the combination of a measuring chamber, a discharge valve therein, means for moving said valve to a position to discharge an additional amount of fluid, said means including a clutch cooperating with said valve, and actuating means adapted to be repeatedly operated to move said clutch a series of predetermined amounts.

6. In a device of the character described, the combination of a fluid reservoir, an inlet for supplying fluid to said reservoir, an outlet for determining a predetermined amount of said fluid, means for exhausting a predetermined amount of said fluid, said means including a collapsible discharge conduit, and means for controlling the passage of fluid to said conduit.

7. In a device of the character described, the combination of a fluid reservoir, an inlet for supplying fluid to said reservoir, an outlet for determining a predetermined amount of said fluid, means for exhausting a predetermined amount of said fluid, said means including a jointed discharge conduit adapted to occupy predetermined positions for discharge, and means carried by said conduit for controlling the passage of fluid to said conduit.

8. In a device of the character described, the combination of a measuring chamber, fluid discharge means therein having a member associated therewith adapted to selectively place said means in predetermined positions, and means cooperating with said first named means adapted to move said means to thereby allow discharge of an added amount of said fluid.

9. In a device of the character described, the combination of fluid discharge means including a jointed pipe whose members are movable in relation to each other, a member associated therewith adapted to selectively place said means in a predetermined position, and means cooperating with said first named means adapted to move said means to successive positions to thereby allow discharge of added amounts of said fluid corresponding to said last named positions.

10. In a device of the character described, the combination of jointed fluid discharge means, a valve for controlling the flow into said means, means associated with said first named means for regulating the amount of fluid to be discharged, and means for successively operating the valve and moving said first named means for discharge of a predetermined increased amount of fluid.

11. In a device of the character described, the combination of a measuring chamber, discharge means therein adapted to be selectively placed for discharging a predetermined amount of fluid, a clutch member associated with said discharge means, and means for operating said clutch member for moving said discharge means to predetermined positions to thereby discharge additional amounts of fluid.

12. In a device of the character described, the combination of discharge means adapted to be placed for discharging predetermined selected amounts of fluid, and means associated with said discharge means for holding said discharge means in selected position, said means being operable remotely from said discharge means.

13. In a device of the character described, the combination of a discharge conduit including a movable fluid receiving member, and collapsible fluid conducting means associated therewith.

14. In a device of the character described, the combination of a discharge conduit including a movable valve controlled fluid receiving member, means for operating said member, and collapsible fluid conducting means associated with said member.

15. In liquid dispensing apparatus, the combination of a measuring chamber, discharge means for discharging a predetermined amount of fluid, said means including draw-off means, and an adjustable leveling receptacle disposed in said chamber, including a jointed pipe whose members are movable in relation to each other connecting said receptacle and draw-off means and movable to permit adjustment of said receptacle.

16. In liquid dispensing apparatus, the combination of a measuring chamber, discharge means in said chamber movable to discharge selective amounts of liquid from said chamber, said means including controlled valved leveling means, a discharge arm pivotally connected to and communicating with said leveling means, said discharge arm being jointed to permit adjustment of said leveling means in said chamber.

17. In liquid dispensing apparatus, the combination of a measuring chamber having a recess provided therein, liquid leveling means disposed in said chamber, said means including a movable conduit having a plurality of relatively movable sections adapted to be received in said recess when said leveling means is moved to predetermined positions.

Signed at Rochester, Pennsylvania, this 9th day of July, 1927.

WILLIAM S. TOWNSEND.
LEO DEUTSCH.